(12) United States Patent
Miyata

(10) Patent No.: US 11,760,178 B2
(45) Date of Patent: Sep. 19, 2023

(54) AUTOMOTIVE DOOR SEALING MEMBER AND METHOD FOR MANUFACTURING THE SAME

(71) Applicant: Nishikawa Rubber Co., Ltd., Hiroshima (JP)

(72) Inventor: Tomonori Miyata, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 926 days.

(21) Appl. No.: 16/658,048

(22) Filed: Oct. 19, 2019

(65) Prior Publication Data
US 2020/0156451 A1    May 21, 2020

(30) Foreign Application Priority Data

Nov. 19, 2018   (JP) .................................. 2018-216133
Jul. 22, 2019   (JP) .................................. 2019-134709

(51) Int. Cl.
| | | |
|---|---|---|
| *B60J 10/76* | (2016.01) | |
| *B60J 10/23* | (2016.01) | |
| *B60J 10/27* | (2016.01) | |
| *B29C 45/14* | (2006.01) | |
| *B29C 48/12* | (2019.01) | |
| *B29C 48/00* | (2019.01) | |

(Continued)

(52) U.S. Cl.
CPC ......... *B60J 10/76* (2016.02); *B29C 45/14409* (2013.01); *B29C 48/0022* (2019.02); *B29C 48/12* (2019.02); *B60J 10/23* (2016.02); *B60J 10/27* (2016.02); *B29C 2793/009* (2013.01); *B29K 2023/12* (2013.01); *B29L 2031/302* (2013.01)

(58) Field of Classification Search
CPC ... B60J 10/23; B60J 10/76; B60J 10/77; B60J 10/79
See application file for complete search history.

(56) References Cited

U.S. PATENT DOCUMENTS

| | | | |
|---|---|---|---|
| 6,405,489 B1 * | 6/2002 | Miura | |
| 8,458,959 B2 * | 6/2013 | Ohtake | ................... B60J 10/86 49/502 |
| 10,220,692 B2 * | 3/2019 | Mori | |

(Continued)

FOREIGN PATENT DOCUMENTS

| | | | |
|---|---|---|---|
| JP | H01-115725 A | 5/1989 | |
| JP | H07-081412 A | 3/1995 | |

(Continued)

*Primary Examiner* — Daniel P Cahn
*Assistant Examiner* — Patrick B. Ponciano
(74) *Attorney, Agent, or Firm* — Renner, Otto, Boisselle & Sklar, LLP

(57) ABSTRACT

When an exterior portion is provided on an exterior surface of an extrusion-molded portion of a sealing member having the extrusion-molded portion and a mold-formed portion, while appearance is made favorable, the exterior portion is inhibited from being damaged. A glass run 20 includes an upper glass run edge 20a which is extrusion-molded, a rear connecting part 20f which is molded integrally with one end portion of the upper glass run edge 20a, and an exterior portion 29 provided on an exterior surface of the upper glass run edge 20a. A surface Si of the rear connecting part 20g on an outside of a passenger compartment is located further outside than a surface of the exterior portion.

3 Claims, 11 Drawing Sheets

(51) Int. Cl.
   *B29L 31/30* (2006.01)
   *B29K 23/00* (2006.01)

(56) References Cited

U.S. PATENT DOCUMENTS

| | | | |
|---|---|---|---|
| 2017/0001505 A1* | 1/2017 | Fukuta | |
| 2017/0259659 A1* | 9/2017 | Kojima | |
| 2017/0361693 A1 | 12/2017 | Miyata | |
| 2019/0176602 A1* | 6/2019 | Takeda | |
| 2022/0097507 A1* | 3/2022 | Kuroki et al. | |

FOREIGN PATENT DOCUMENTS

| | | |
|---|---|---|
| JP | H10-193549 A | 7/1998 |
| JP | H10-329218 A | 12/1998 |
| JP | 2014-196051 A | 10/2014 |

\* cited by examiner

OUTSIDE OF PASSENGER COMPARTMENT

INSIDE OF PASSENGER COMPARTMENT

AUTOMOTIVE DOOR SEALING MEMBER AND METHOD FOR MANUFACTURING THE SAME

CROSS-REFERENCE TO RELATED APPLICATION

This application claims priority to Japanese Patent Application No. 2018-216133 filed on Nov. 19, 2018, and 2019-134709 filed on Jul. 22, 2019, the entire disclosures of which are incorporated by reference herein.

BACKGROUND

The present disclosure relates to a sealing member provided for an automotive door and a method for manufacturing an automotive door sealing member and particularly belongs to a technical field of a structure having an exterior portion for enhancing design of an exterior surface of a passenger compartment.

Conventionally, a variety of sealing members are provided for automotive doors. For example, in Japanese Unexamined Patent Publication No. 2017-226239, a glass run for holding a window glass which is provided for an automotive door in such a way as to be operable to ascend and descend is disclosed. In addition, in Japanese Unexamined Patent Publication No. 2014-196051, a belt line sealing member which is provided for a belt line part of an automotive door is disclosed.

The glass run disclosed in Japanese Unexamined Patent Publication No. 2017-226239 includes an upper glass run edge which extends along an upper edge of a sash of the automotive door in a front-rear direction and a front glass run edge and a rear glass run edge which extend along a front edge and a vertical edge of the sash, respectively in an up-down direction. Whereas the upper glass run edge, the front glass run edge, and the rear glass run edge are extrusion-molded portions formed by extrusion molding, a connecting portion between the upper glass run edge and the front glass run edge and a connecting portion between the upper glass run edge and the rear glass run edge are mold-formed portions molded by a molding die which opens and closes. In addition, on an exterior surface of the upper glass run edge, an exterior portion for enhancing design is provided.

In addition, in Japanese Unexamined Patent Publication No. 2014-196051, the belt line sealing member includes a main body part and an exterior portion provided on an exterior surface of the main body part, and upon extrusion molding, the exterior portion is extruded from an extrusion die together with a material of the main body part, thereby integrally molding the main body part and the exterior portion. At this time, the above-mentioned material is molded in such a way as to cover an end portion of the exterior portion by the material of the main body part.

As in Japanese Unexamined Patent Publication No. 2014-196051, the exterior portion can be obtained with the main body part integrated therewith upon extrusion molding the material of the main body part. As in Japanese Unexamined Patent Publication No. 2017-226239, when the mold-formed portions are formed to be continuous with the extrusion-molded portions, in general, on an appearance surface of the sealing member, surfaces of the mold-formed portions are formed to be flush with a surface of the exterior portion provided for the extrusion-molded portions.

However, with the surface of the exterior portion of the extrusion-molded portions flush with the exterior surfaces of the mold-formed portions, after molding the mold-formed portions, such as a handling step until the sealing member is attached to a door and an assembly step of the vehicle when an exterior member such as a garnish is attached to cover the mold-formed portions after attaching the sealing member to the door, some objects easily hit an end portion of the exterior portion in the connecting portion between the exterior portion of the extrusion-molded portions and the mold-formed portions. This may cause flaws such as chipping of the exterior portion and peeling of the exterior portion from its end portion if the exterior portion is formed of film. In addition, even in a case of a completed vehicle, if the exterior of the vehicle lets the end portion of the exterior portion look exposed, the exterior portion might be noticeable. Moreover, if some objects make contact with a periphery of the end portion of the exterior portion, such as in washing the vehicle, the objects are likely to hit the end portion of the exterior portion such that the exterior portion could be damaged.

In this regard, in Japanese Unexamined Patent Publication No. 2014-196051, a structure in which a side end portion of the exterior portion is covered by the material of the main body part upon extrusion molding is shown. It is considered that a method similar thereto is applied to the mold-formed portions.

However, if the end portion of the exterior portion is to be covered by the material of the main body part molded by the molding die, a size (shape) of the covered portion is determined, taken variation in mass production into consideration. In other words, in order to allow the end portion of the exterior portion to be reliably covered by the material of the main body part even if the variation in mass production has occurred, it is required to make a dimension of the covered portion in a vehicle front-rear direction long and to make a thickness in a passenger compartment inside-outside direction large. If the dimensions of the portion covering the end portion of the exterior portion are set as mentioned above, the covered portion has a shape which largely protrudes toward an outside of the passenger compartment from the exterior portion, thereby causing deterioration in appearance. In addition, when the exterior member such as the garnish is attached to cover this portion, it is required to consider interference with the exterior member.

In view of the above-described regards, the present disclosure has been devised. The present disclosure is intended to reduce damage on an exterior portion while appearance is made favorable when the exterior portion is provided on an exterior surface, toward the passenger compartment, of an extrusion-molded portion of a sealing member having the extrusion-molded portion and a mold-formed portion, and to make appearance of an exterior member attractive even an exterior member is attached for covering the exterior portion.

SUMMARY

In order to achieve the above-mentioned objects, a first disclosure is an automotive door sealing member provided for an automotive door, which includes: an extrusion-molded portion formed by extrusion molding; a mold-formed portion formed integrally with the extrusion-molded portion in such a way as to be continuous with one end portion of the extrusion-molded portion in a longitudinal direction; and an exterior portion provided on an exterior surface in such a way as to reach the one end portion of the extrusion-molded portion, and a surface of the mold-formed portion on an outside of a passenger compartment is located further outside than a connecting end portion of the exterior portion.

By employing the above-described configuration, since the surface of the mold-formed portion on the outside of the passenger compartment is located further outside than the connecting end portion of the exterior portion provided for the extrusion-molded portion, for example, upon handling the sealing member until the sealing member is attached to a door and upon assembling of other components, conducted subsequent to the attachment, some objects are likely to hit the surface of the mold-formed portion on the outside of the passenger compartment, as compared with the connecting end portion of the exterior portion, and as a result, the objects are less likely to hit the connecting end portion of the exterior portion in a connecting position between the extrusion-molded portion and the mold-formed portion. Thus, without providing a portion to cover the end portion of the exterior portion, the exterior portion can be inhibited from being damaged. In addition, even after completing a vehicle, in a case of a vehicle with the above-mentioned connecting portion exposed, upon washing of the vehicle or like, the damage of the exterior portion may occur. However, the damage thereof is also hindered.

In addition, since the connecting end portion of the exterior portion is shadowed by the connecting end portion of the mold-formed portion, also in the case of the completed vehicle with the connecting end portion exposed, the connecting end portion of the exterior portion is less likely to be conspicuous, thereby suppressing deterioration in appearance.

In a second disclosure, a material of the exterior portion is harder than a material of the mold-formed portion.

By employing the above-described configuration, since the exterior portion is formed of a hard material, wrinkles and the like are less likely to be made, thereby further improving appearance of the exterior portion. On the other hand, if the exterior portion is hard, the connecting end portion of the exterior portion is likely to chip when some object hit the exterior portion. However, the mold-formed portion having a lower hardness than that of the exterior portion is located further outside than the connecting end portion of the exterior portion on the outside of the passenger compartment, thereby absorbing impact and inhibiting the occurrence of chipping or the like.

In a third disclosure, between the surface of the mold-formed portion on the outside of the passenger compartment and the connecting portion of the exterior portion, a step is formed.

By employing the above-described configuration, since the connecting end portion of the exterior portion is to be located in such a way as to be hidden by a shadow of the step, the connecting end portion thereof is less likely to be conspicuous and deterioration in appearance is suppressed.

In a fourth disclosure, a dimension of the step is 0.01 mm or more and 0.2 mm or less.

Specifically, if the step between the surface of the mold-formed portions on the outside of the passenger compartment and the connecting end portion of the exterior portion is less than 0.01 mm, upon handling the sealing member before the sealing member is attached to the vehicle or upon assembling the vehicle such as upon covering the mold-formed portion with an exterior member such as a garnish after attaching the sealing member to the door as well as upon washing of the completed vehicle or the like, some objects are likely to hit the connecting end portion of the exterior portion. On the other hand, if the step between the surface of the mold-formed portions on the outside of the passenger compartment and the connecting end portion of the exterior portion exceeds 0.2 mm, for example, the presence of the step becomes visually conspicuous, deterioration in appearance may occur, and when touched by a finger or the like, the step is easily tactually perceived, thereby causing the concern that some objects are caught on the step upon washing of the vehicle. Therefore, by setting the step in the range of 0.01 mm or more and 0.2 mm or less, the appearance is not impaired, and the step can be less likely to be tactually perceived. It is more preferable that an upper limit of the dimension of the step is 0.15 mm or less and it is further preferable that the upper limit is 0.1 mm or less.

A fifth disclosure is a method for manufacturing an automotive door sealing member provided for an automotive door, the method including: extrusion-molding a material and obtaining an extrusion-molded portion on a surface to be an exterior surface of a passenger compartment in a longitudinal direction by laminating an exterior portion and a peelable tape covering the exterior portion in a multi-layered manner; cutting the extrusion-molded portion in a fixed length; and disposing the tape laminated on the exterior portion in a molding die in such a way that a side surface of the tape makes contact with the molding die and setting the extrusion-molded portion in the molding die, and thereafter, supplying a material into the mold and integrally molding a mold-formed portion such a way as to be continuous with one end portion of the cut extrusion-molded portion in the longitudinal direction.

By employing the above-described configuration, with the surface of the tape laminated on the exterior portion pressed against the molding die and thereby making contact with the molding die, the mold-formed portion and the extrusion-molded portion can be integrally formed of the material supplied into the molding die. Thereafter, upon peeling the tape from the exterior portion, the surface of the mold-formed portions on the outside of the passenger compartment is located further outside than the connecting end portion of the exterior portion by a dimension corresponding to a thickness of the tape. Thus, since for example, upon handling the sealing member until the sealing member is attached to the door, upon assembling the vehicle, or upon washing of the vehicle after the attachment or the like, some objects are less likely to hit the end portion of the exterior portion. Without providing a portion largely covering the connecting end portion of the exterior portion from outside, the exterior portion is hindered from being damaged.

In addition, since the connecting end portion of the exterior portion is shadowed by the connecting end portion of the mold-formed portion, the connecting end portion of the exterior portion is less likely to be conspicuous, thereby suppressing the deterioration in appearance.

In a sixth disclosure, the tape is a protective tape for protecting the exterior portion.

By employing the above-described configuration, by utilizing the protective tape peeled from the exterior portion by the completion of the vehicle, the surface of the mold-formed portion on the outside of the passenger compartment can be formed to be located further outside than the surface of the exterior portion on the outside of the passenger compartment.

According to the present disclosure, since in the connecting portion between the extrusion-molded portion and the mold-formed portion, the surface of the mold-formed portion on the outside of the passenger compartment is formed to be located further outside than the surface of the exterior portion provided for the extrusion-molded portion on the outside of the passenger compartment. Without providing the portion largely covering the connecting end portion of the exterior portion from outside, the exterior portion can be hindered from being damaged, and the appearance can be made favorable.

DETAILED DESCRIPTION

Hereinafter, embodiments of the present disclosure will be described in detail with reference to the accompanying drawings. Note that the following description of preferred embodiments is merely illustrative in nature and is not intended to limit applications or uses of the present disclosure.

First Embodiment

Figure 1:
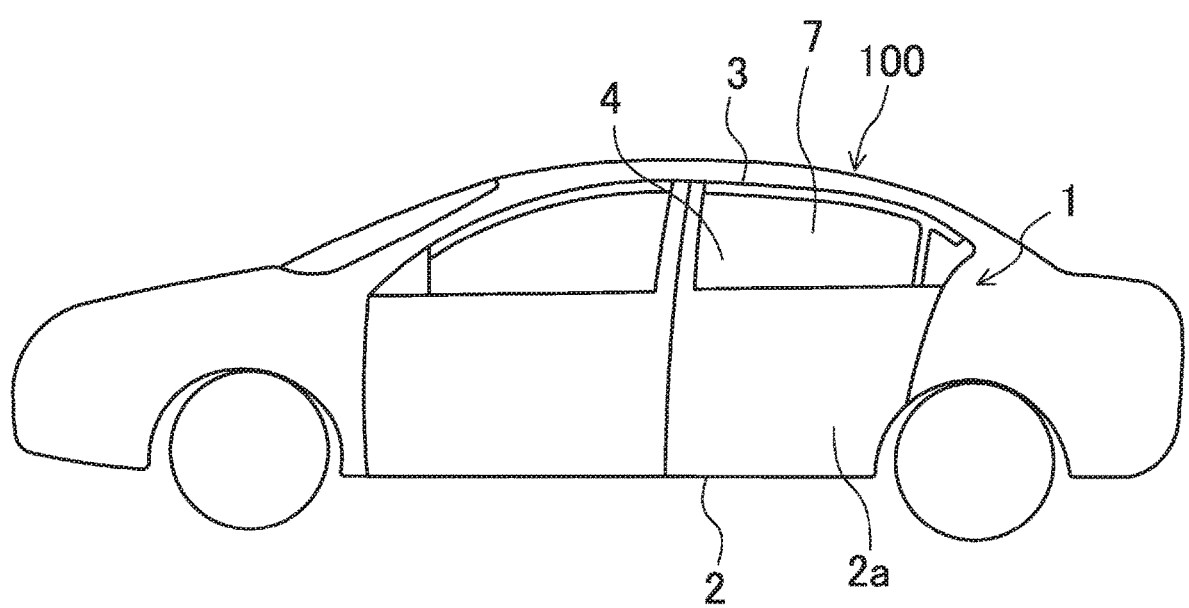
FIG. 1 is a left side view of an automobile which includes a glass run as an automotive door sealing member according to a first embodiment of the present disclosure.
Figure 2:
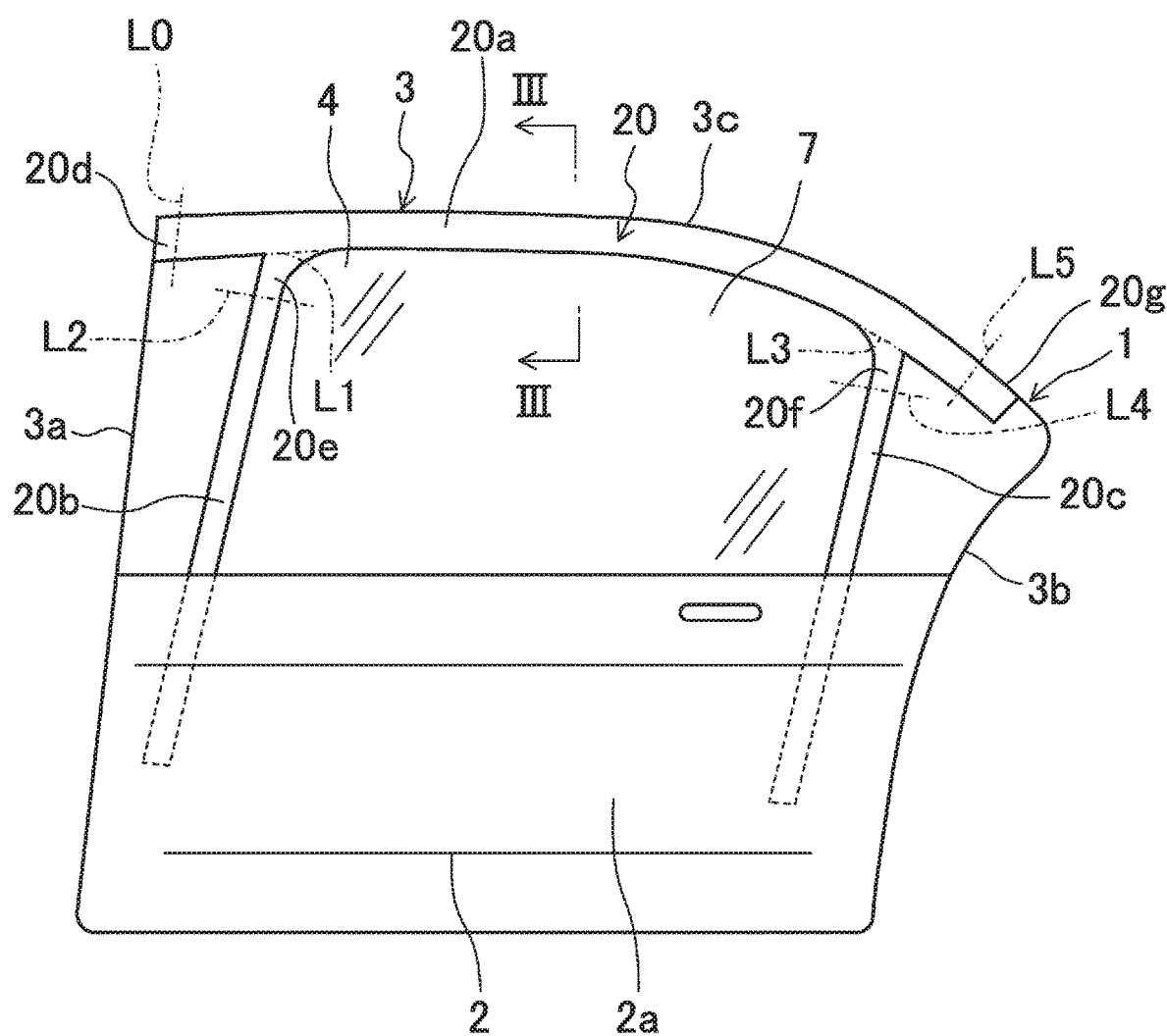
FIG. 2 is a left side view of a left rear door which includes the glass run as the automotive door sealing member according to the first embodiment of the present disclosure.

FIG. 1 is a left side view of an automobile 100 which includes an automotive door sealing member according to an embodiment of the present disclosure. FIG. 2 is a left side view of a left rear door 1 which includes the automotive door sealing member according to a first embodiment. In the description of this embodiment, a case in which the present disclosure is applied to the left rear door 1 of the automobile will be described. However, the present disclosure can be similarly applied to a front door and a right door.

(Configuration of Door)

The door 1 is a rear door disposed on a rear side of a left side portion of the automobile 100 and opens and closes an opening part (not shown), which is formed on the rear side of the left side part of the automobile 100, for a passenger to get in and out of the automobile 100. Note that in the description of this embodiment, a vehicle front side is simply referred to as "front," and a vehicle rear side is simply referred to as "rear."

The automotive door 1 has a door body 2 constituting a substantially lower half of the automotive door 1 and a window frame 3 constituting a substantially upper half thereof. Although it is not shown, a front end portion of the door body 2 is attached to a pillar of a vehicle body via a hinge having a rotating shaft extending in an up-down direction. The door body 2 is constituted of two panels on an outside and an inside of the passenger compartment (In FIG. 1, a panel 2a on the outside of the vehicle is shown) formed of, for example, a steel plate or the like, and a window glass 4 which ascends and descends, a lifting device (not shown) for lifting and lowering the window glass 4, and the like can be housed inside the door body 2.

Figure 3:
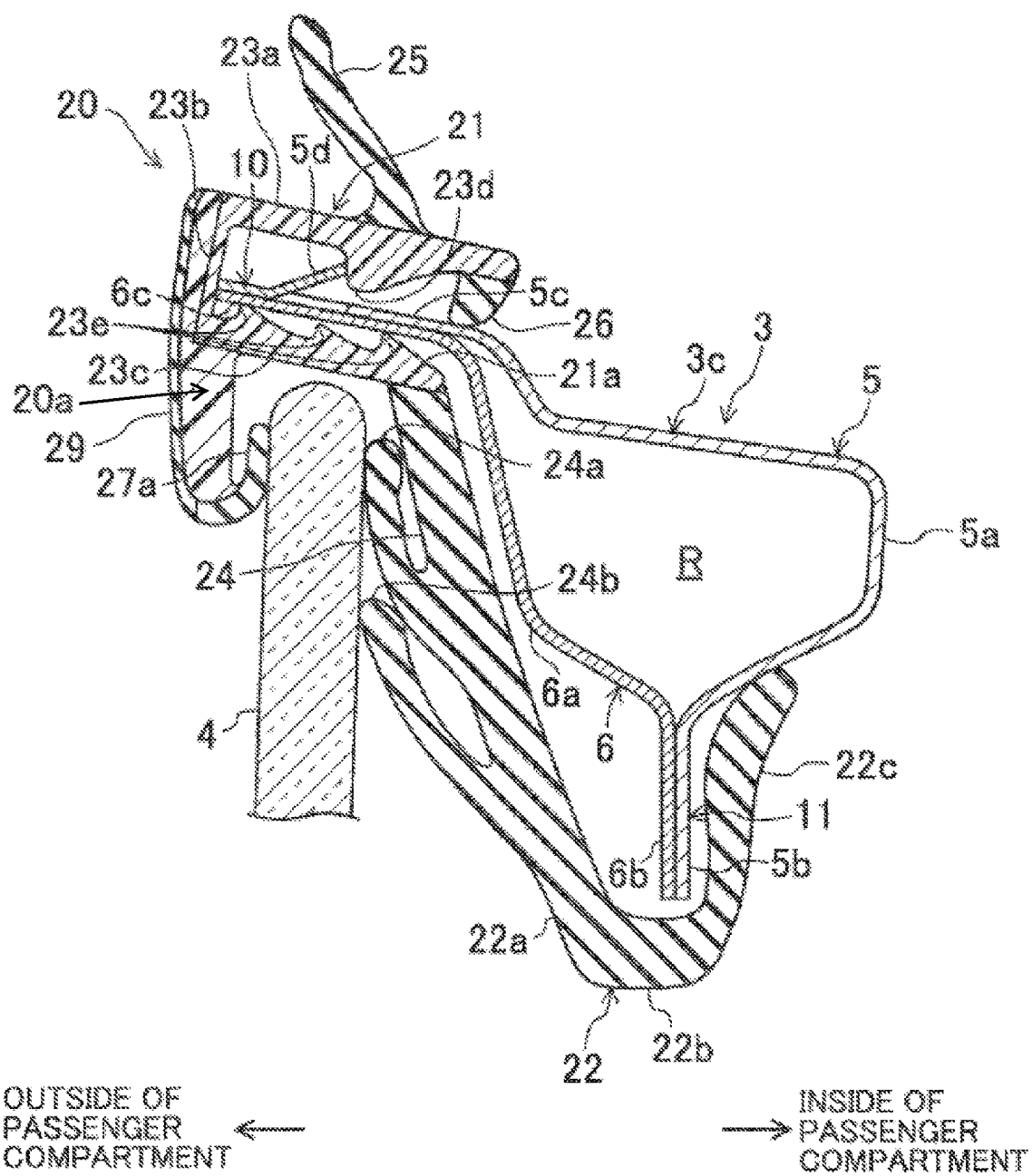
FIG. 3 is a cross-sectional view taken along line III-III in FIG. 2.

The window frame 3 functions as a sash which holds a peripheral portion of the window glass 4 and extends to define a window opening 7. The window glass 4 is configured to cover or uncover the window opening 7 defined by the window frame 3. The window frame 3 in this embodiment is configured by combining a first panel member 5 and a second panel member 6 which are formed of a steel plate or the like and are press-molded, as shown in FIG. 3. Note that the window frame 3 may be formed by, for example, roll forming.

As shown in FIG. 2, the window frame 3 is constituted of a front frame part 3a, a rear frame part 3b, and an upper frame part 3c. The front frame part 3a protrudes upward from a front portion of an upper edge of the door body 2. The rear frame part 3b extends upward from a rear portion of the upper edge of the door body 2. The front frame part 3a extends to be taller than the rear frame part 3b. The upper frame part 3c extends in a front-rear direction from an upper end of the front frame part 3a to an upper end of the rear frame part 3b along a side edge of a roof (not shown) of the automobile body. The shape of the upper frame part 3c is not limited to the illustrated one. Alternatively, the upper frame part 3c may be entirely curved upward or may have a curved portion optionally positioned or an inclination angle optionally determined in association with the roof shape of the automobile body.

As shown in FIG. 3, the window frame 3 includes a plate glass run mount 10 protruding toward the outside of the passenger compartment and an inner peripheral flange 11 protruding toward the inside of the window opening 7 (shown in FIG. 1). The plate glass run mount 10 extends in the front-rear direction along the upper frame part 3c, and is curved in a side view as with the upper frame part 3c. The inner peripheral flange 11, which protrudes toward the inside of the window opening 7, protrudes downward in the upper frame part 3c. The front and rear frame parts 3a and 3b may be configured in the same manner as the inner peripheral flange 11 is. In such a case, an inner peripheral flange in the front frame part 3a extends rearward and an inner peripheral flange in the rear frame part 3b extends forward. Each of the front frame part 3a and the rear frame part 3b may have a structure different from a structure of the upper frame part 3c.

For the first panel member 5 inside the window opening 7, an inner plate part 5b extending toward the inside of the window opening 7 is formed. For the second panel member 6 inside the window opening 7, an inner plate part 6*b* extending toward the inside of the window opening 7 is formed. For the first panel member 5 outside the window opening 7, an outer plate part 5*c* extending toward the outside of the passenger compartment is formed. For the second panel member 6 outside the window opening 7, an outer plate part 6*c* extending toward the outside of the passenger compartment is formed.

By superposing and joining the inner plate part 5*b* of the first panel member 5 and the inner plate part 6*b* of the second panel member 6 in an inward-outward direction of the passenger compartment, the inner peripheral flange 11 is configured. In addition, by superposing and joining the outer plate part 5*c* of the first panel member 5 and the outer plate part 6*c* of the second panel member 6 in the up-down direction, the plate glass run mount 10 is configured. The outer plate part 5*c* of the first panel member 5 constituting an upper portion of the plate glass run mount 10 is provided with a cut and raised part 5*d* obtained by cutting and raising one portion of the outer plate part 5*c* upward. A base end portion of the cut and raised part 5*d* is located on the outer plate part 5*c* outside the passenger compartment, and the cut and raised part 5*d* is inclined upward from the base end portion toward the inside of the passenger compartment. This cut and raised part 5*d* is to prevent the later-described glass run 20 from dropping off. However, when the glass run 20 can be prevented from dropping off even without the cut and raised part 5*d*, the cut and raised part 5*d* may be omitted.

(Configuration of Glass Run 20)

A glass run 20 is an automotive door sealing member provided for the automotive door 1. The glass run 20 is the so-called "hiding type" glass run which covers and hides a portion of the window frame 3 at least from the outside of the passenger compartment. As will be described in detail later, the glass run 20 is assembled to the window frame 3 from the outside of the passenger compartment and functions as a member which seals a gap between the window frame 3 and the window glass 4. The glass run 20 is formed in such a way as to cover an outer surface of the plate glass run mount 10, which is an outer surface of the window frame 3, and the inner peripheral flange 11.

As shown in FIG. 2, the glass run 20 includes an upper glass run edge 20*a* extending along the upper frame part 3*c* of the window frame 3, a front longitudinal glass run edge 20*b* extending along the front frame part 3*a*, and a rear longitudinal glass run edge 20*c* extending along the rear frame part 3*b*. Further, the glass run 20 includes a front terminal part 20*d* formed by extending a front end portion of the upper glass run edge 20*a* in a longitudinal direction of the upper glass run edge 20*a*, a front connecting part 20*e* which connects a front portion of the upper glass run edge 20*a* and an upper end portion of the front longitudinal glass run edge 20*b*, a rear connecting part 20*f* which connects a rear portion of the upper glass run edge 20*a* and an upper end portion of the rear longitudinal glass run edge 20*c*, and a rear terminal part 20*g* formed by extending a rear end portion of the upper glass run edge 20*a* in the longitudinal direction thereof.

Specifically, a portion ahead of a boundary L0 is the front terminal part 20*d*, a portion sandwiched between boundaries L1 and L2 (indicated by a dot-and-dash line) is the front connecting part 20*e*, a portion sandwiched between boundaries L3 and L4 (indicated by a dot-and-dash line) is the rear connecting part 20*f*, and a portion behind a boundary L5 is the rear terminal part 20*g*. The shape of the illustrated glass run 20 is one example, and the glass run 20 can be formed to be of any shape in accordance with a structure of the door 1 and the like. In addition, the boundaries for the front terminal part 20*d*, the front connecting part 20*e*, the rear connecting part 20*f*, and the rear terminal part 20*g* are illustrated as examples, and positions and shapes of the boundaries can be optionally set.

Figure 6A:
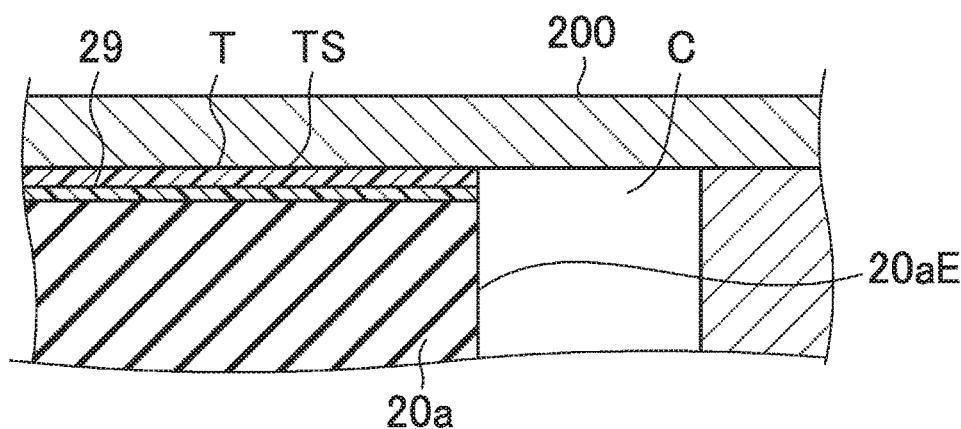
FIG. 6A illustrates a state of a manufacturing method in which an extrusion-molded portion is set in a molding die.
Figure 6B:
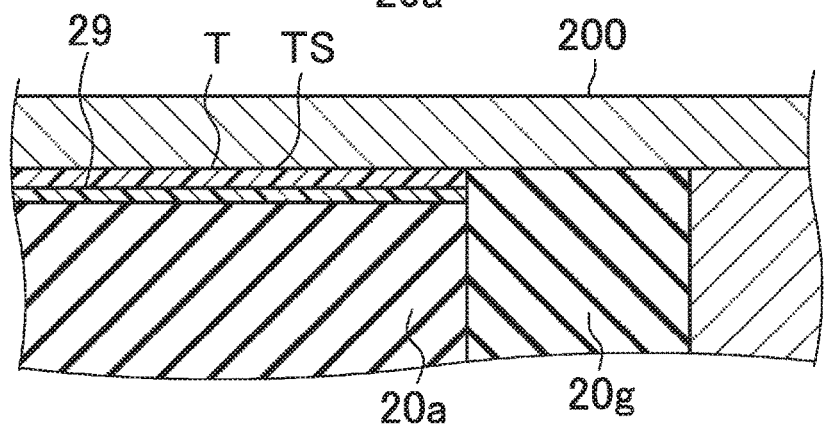
FIG. 6B illustrates a state of the manufacturing method in which a rear connecting portion has been molded.
Figure 6C:
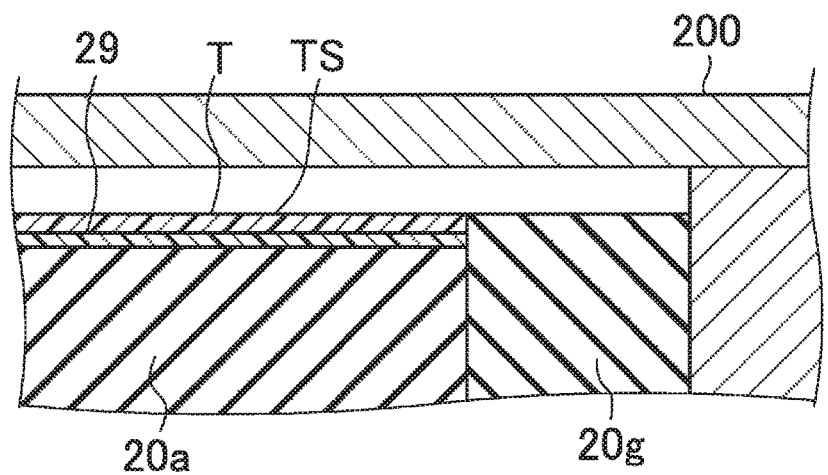
FIG. 6C illustrates a state of the manufacturing method in which a glass run is removed from a molding die.

The upper glass run edge 20*a*, the front longitudinal glass run edge 20*b*, and rear longitudinal glass run edge 20*c* are extrusion-molded portions obtained by extrusion-molding a material, and cross-sectional shapes are substantially uniform over respective both end portions in respective longitudinal directions. On the other hand, the front terminal part 20*d*, the front connecting part 20*e*, the rear connecting part 20*f*, and the rear terminal part 20*g* are mold-formed portions obtained by molding a material by using a molding die 200 (only one part thereof is illustrated in FIGS. 6(A) to 6(C)) which opens and closes. The front terminal part 20*d* is formed integrally with the extrusion-molded upper glass run edge 20*a* in such a way as to protrude forward and to be continuous with a front end portion of the upper glass run edge 20*a* in a longitudinal direction. The front connecting part 20*e* is formed integrally with the upper glass run edge 20*a* and the front longitudinal glass run edge 20*b* in such a way as to be continuous with a front portion of the upper glass run edge 20*a* and an upper end portion of the front longitudinal glass run edge 20*b*. The rear connecting part 20*f* is formed integrally with the upper glass run edge 20*a* and the rear longitudinal glass run edge 20*c* in such a way as to be continuous with a rear end portion of the upper glass run edge 20*a* and an upper end portion of the rear longitudinal glass run edge 20*c*. The rear terminal part 20*g* is formed integrally with the extrusion-molded upper glass run edge 20*a* in such a way as to protrude backward and to be continuous with a rear end portion of the upper glass run edge 20*a* in the longitudinal direction.

Figure 4:
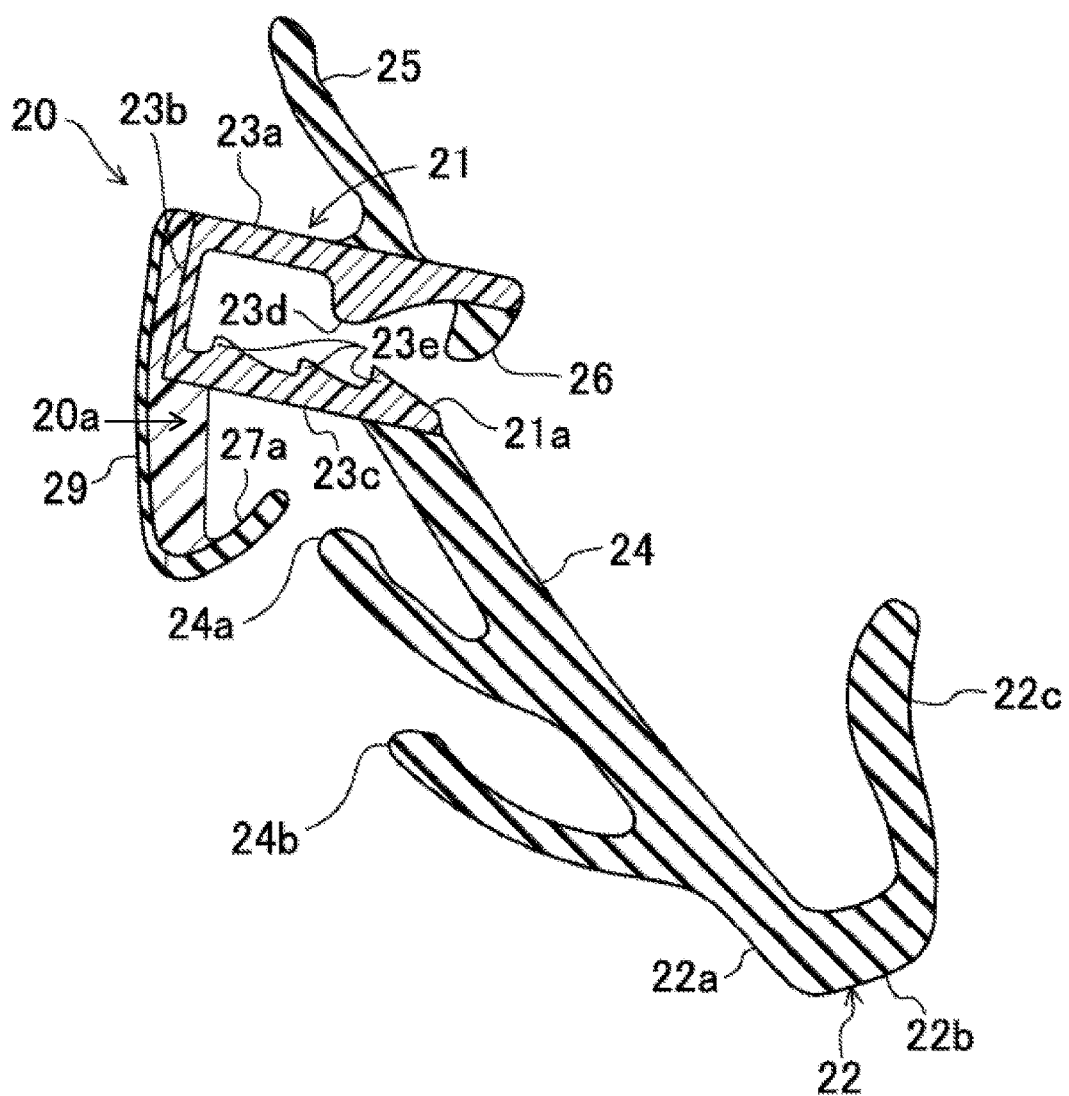
FIG. 4 is a cross-sectional view of a single glass run corresponding to a portion viewed along line III-III in FIG. 2.

As shown in FIGS. 3 and 4, the upper glass run edge 20*a* of the glass run 20 includes: a glass run body 21 assembled to the plate glass run mount 10 of the window frame 3; and an inner decoration lip 22 molded integrally with the glass run body 21. Note that the inner decoration lip 22 may be omitted. The glass run body 21 has an upper plate part 23*a*, a lower plate part 23*c*, and a longitudinal plate part 23*b* coupling the upper plate part 23*a* and the lower plate part 23*c*.

The upper plate part 23*a* and the lower plate part 23*c* are portions which sandwich and hold the plate glass run mount 10 of the window frame 3 in a thickness direction (in an up-down direction). Specifically, the upper plate part 23*a* extends along an upper surface of the plate glass run mount 10 from an end portion of the plate glass run mount 10 on the outside of the passenger compartment to a portion of the plate glass run mount 10 on the inside of the passenger compartment and extends from a front end portion of the upper frame part 3*c* to a rear end portion thereof in a front-rear direction. On the lower surface of the upper plate part 23*a*, a first protrusion part 23*d* which protrudes downward in the middle portion of an inward-outward direction of the passenger compartment is formed. The cut and raised part 5*d* of the plate glass run mount 10 in an inserted state abuts against the first protrusion part 23*d* from the outside of the passenger compartment and engages therewith. In addition, the lower plate part 23*c* extends along a lower surface of the plate glass run mount 10 from an end portion of the plate glass run mount 10 on the outside of the passenger compartment toward the inside of the passenger compartment and extends from an front end portion of the upper frame part 3*c* to a rear end portion thereof in a front-rear direction. The upper plate part 23a and the lower plate part 23c are substantially in parallel with each other. On an upper surface of the lower plate part 23c, second protrusion parts 23e are formed in such a way as to be spaced apart from one another in the inward-outward direction of the passenger compartment. At least one of the second protrusion parts 23e abut against a lower surface of the plate glass run mount 10 in the inserted state.

Between end portions of the upper plate part 23a and the lower plate part 23c of the glass run body 21 on the inside of the passenger compartment, an insertion port 21a into which the plate glass run mount 10 of the window frame 3 is inserted is formed in such a way as to open toward the inside of the passenger compartment. This insertion port 21a is of a long slit shape in a direction, in which the plate glass run mount 10 extends, on the inside of the passenger compartment. Accordingly, the plate glass run mount 10 of the window frame 3 is inserted from the insertion port 21a between the upper plate part 23a and the lower plate part 23c. At this time, since the upper plate part 23a and the lower plate part 23c extend in the inward-outward direction of the passenger compartment, a direction in which the plate glass run mount 10 is inserted is the inward-outward direction of the passenger compartment. The plate glass run mount 10 is inserted deeply between the upper plate part 23a and the lower plate part 23c.

On an exterior surface (surface facing the outside of the passenger compartment) of the longitudinal plate part 23b on the outside of the passenger compartment, an exterior portion 29 constituting a part of appearance design of the vehicle is provided. The exterior portion 29 is a portion formed by integral extrusion-molding (also referred to as laminated extrusion molding) conducted simultaneously upon extrusion-molding the upper glass run edge 20a. The exterior portion 29 can be formed of, for example, a generally used resin material such as a polypropylene compound and is provided in a layered state on an exterior surface of the longitudinal plate part 23b.

A hardness of the material of the exterior portion 29 is set to be harder than an elastic material forming the front connecting part 20e and the rear connecting part 20f which are the mold-formed portions. Therefore, a surface hardness of the exterior portion 29 is higher than a surface hardness of each of the front terminal part 20d, the front connecting part 20e, the rear connecting part 20f, and the rear terminal part 20g. The surface hardness of the exterior portion 29 is, for example, 90 or more when measured by a type A durometer specified in the standards of JIS K 6253. By increasing the surface hardness of the exterior portion 29, wrinkles and the like are unlikely to be formed on the exterior portion 29, thereby enhancing appearance.

The exterior portion 29 can be obtained, for example, also by affixing a design (decorative) film separately prepared upon extrusion-molding the upper glass run edge 20a. Upon affixing the film, an adhesive layer provided for the design film can be used. Also in this case, a surface hardness of the exterior portion 29 is higher than the surface hardness of each of the front terminal part 20d and the rear terminal part 20g. The method of forming the exterior portion 29 is not limited to the above-described methods, and the exterior portion 29 can be formed by a variety of methods.

The exterior portion 29 extends in the front-rear direction, covering the whole of a side surface of the glass run body 21 on the outside of the vehicle and is provided over both end portions (a front end portion and a rear end portion) of the longitudinal direction of the upper glass run edge 20a. Note that the exterior portion 29 may cover a part of the side surface of the glass run body 21 on the outside of the vehicle, instead of the whole thereof as is seen in FIG. 3.

Figure 5:
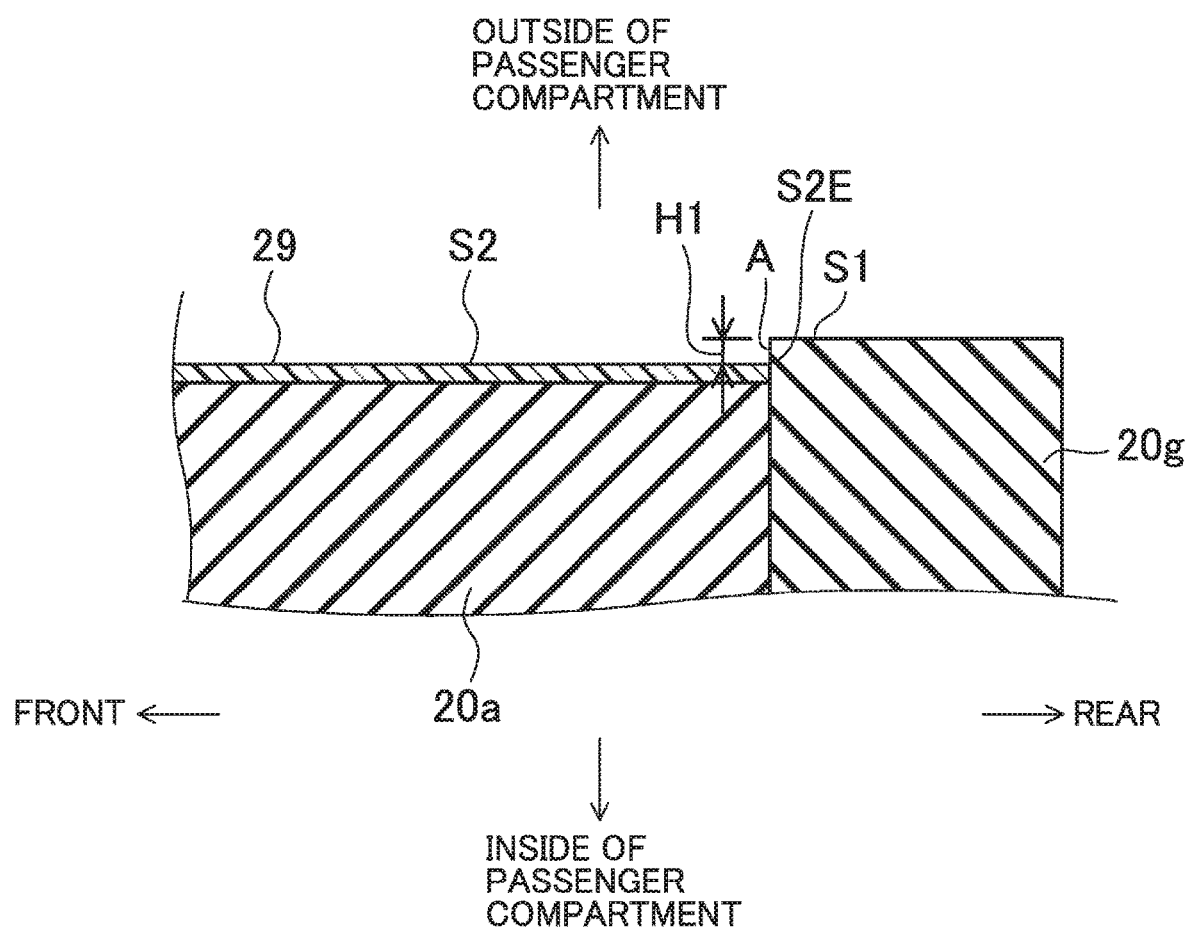
FIG. 5 is a cross-sectional view taken along line V-V in FIG. 10.
Figure 10:
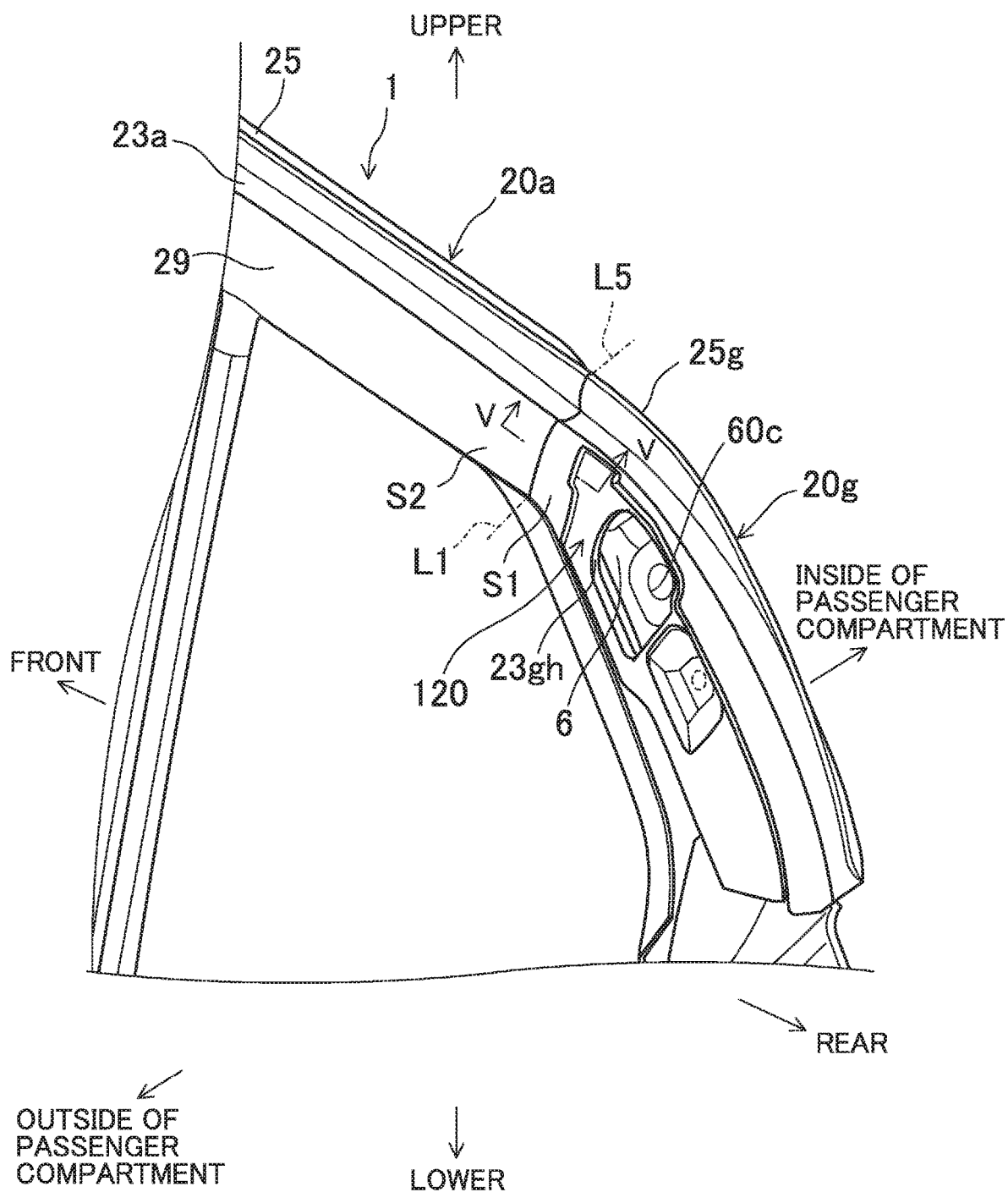
FIG. 10 is a perspective view of a rear portion of the rear door with a garnish removed, viewed from an inside of the passenger compartment.

As shown in FIG. 5 in which a cross section viewed along line V-V in FIG. 10 is illustrated, as is seen in a cross section of a connecting portion of the end portion of the upper glass run edge 20a and the rear terminal part 20g, a surface S1 of the rear terminal part 20g on the outside of the passenger compartment is formed in such a way as to be located further outside than a surface S2 of the rear end portion of the exterior portion 29 on the outside of the passenger compartment. Thus, between the surface S1 of the rear terminal part 20g on the outside of the passenger compartment and the connecting portion of the exterior portion 29, a substantially vertical step A is formed. More precisely, this step A is located between the surface S1 of the rear terminal part 20g in the connecting position on the outside of the passenger compartment and a surface S2E of the connecting end portion of the exterior portion 29 on the outside of the passenger compartment. In addition, a size of the step A can be indicated by a distance dimension H1, in the inward-outward direction, between the surface S1 of the rear terminal part 20g in the connecting position on the outside of the passenger compartment and the surface S2E in the connecting end portion of the exterior portion 29 on the outside of the passenger compartment. In this embodiment, positional relationship between the surfaces S1 and S2 is defined such that the dimension H1 is 0.01 mm or more and 0.2 mm or less.

Specifically, if the dimension H1 of the step A between the surface S1 of the rear terminal part 20g on the outside of the passenger compartment and the connecting portion of the exterior portion 29 is less than 0.01 mm, upon assembling the vehicle, some objects are likely to hit the end portion of the exterior portion 29. If some objects hit the end portion of the exterior portion 29, the hitting may cause flaws such as chipping of the exterior portion 29 and peeling of the exterior portion 29 from its end portion if the exterior portion 29 is formed of film.

The rear end portion of the upper glass run edge 20a is cited as an example for the description. In this position, a garnish 300 covering the rear end portion thereof from outside is assembled (see FIG. 9). The garnish 300 is inserted into an attaching hole located in the rear terminal part 20g of the glass run 20, is engaged with an attaching hole 60c of the automobile body panel (second panel member 6), and fixed by an engagement protrusion (not shown) (see FIG. 10). The garnish 300 assembled thereto also covers the exterior portion 29 beyond a Line L5 which corresponds to a boundary (the connecting position) between the rear end portion of the upper glass run edge 20a and the rear terminal part 20g. As shown in FIG. 10, a reinforcement outsert panel 120 formed of a hard resin is disposed between the rear terminal part 20g and the automobile body panel, and in particular, the connecting position between the upper glass run edge 20a and the rear terminal part 20g is supported by a reinforcement outsert panel 120 from the inside of the passenger compartment and is fixed to the automobile body panel. Because the surface S1 of the rear terminal part 20g on the outside of the passenger compartment protrudes further outside on the outside of the passenger compartment than the surface S2 of the rear end portion of the upper glass run edge 20a on the outside of the passenger compartment, upon assembling the garnish 300 thereto, the garnish 300 is likely to hit the rear terminal part 20g in advance and is less likely to hit the exterior portion 29. In particular, the garnish 300 does not hit the connecting end portion of the exterior portion 29, and the exterior portion 29 is less likely to be damaged.

If the distance H1 of the step A between the surface S1 of the rear terminal part 20g on the outside of the passenger compartment and the connecting end portion of the exterior portion 29 is less than 0.01 mm, upon assembling the garnish 300, an object such as a hand of a person and the garnish 300 easily hits the connecting end portion of the exterior portion 29, and flaws such as chipping of the exterior portion 29 and peeling of the exterior portion 29 from the connecting end portion thereof, if the exterior portion 29 is formed of the film, may be caused.

If the dimension H1 of the step A between the surface S1 of the rear terminal part 20g on the outside of the passenger compartment and the end portion of the exterior portion 29 exceeds 0.2 mm, a large gap between the assembled garnish 300 and the exterior portion 29 may be formed upon assembling the garnish 300 for covering. Such a dimension H1 is not preferable. This is because the garnish 300 is inserted into an attaching hole 23gh located in the rear terminal part 20g of the glass run 20 and is engaged with and fixed to the attaching hole 60c of the automobile body panel (second panel member 6), that is, because the garnish 300 is assembled to the automobile body panel with significantly high precision and is set to cover the exterior portion 29 of the upper glass run edge 20a with no gap. Note that the connecting position between the upper glass run edge 20a and the rear terminal part 20g is supported and fixed by the reinforcement outsert panel 120 from the inside of the passenger compartment, and the garnish 300 is going to cover the exterior portion 29. As described above, however, because the rear terminal part 20g protrudes further outside on the outside of the passenger compartment than the rear end portion of the upper glass run edge 20a, the rear terminal part 20g interferes with the garnish 300 and is fixed. As described later, since the rear terminal part 20g of the glass run 20 is formed of a soft rubbery elastic body, even when the garnish 300 interferes with the rear terminal part 20g in the position where the garnish 300 is assembled, because of the flexibility thereof, the interference is absorbed, and the garnish 300 can be assembled to the exterior portion 29 with no gap. However, if the dimension H1 of the step A exceeds 0.2 mm, the interference fails to be absorbed enough, and a gap between the garnish 300 and the exterior portion 29 may be formed.

In other words, if the dimension H1 of the step A between the surface S1 of the rear terminal part 20g in the connecting position on the outside of the passenger compartment and the surface S2E in the connecting end portion of the exterior portion 29 on the outside of the passenger compartment shown in FIG. 5 is less than 0.01 mm, some objects are likely to hit the connecting end portion of the exterior portion 29, and if the dimension H1 exceeds 0.2 mm, the appearance is adversely influenced.

Next, the front end portion of the upper glass run edge 20a and the connecting portion of the front terminal part 20d on the outside of the passenger compartment in a front portion of the rear door 1 shown in FIG. 1 will be described. Also in this connecting portion, a step is formed as with the step A on the rear side. This portion is not covered by the garnish 300, and the step is exposed as an exterior of the vehicle. However, if a dimension H1 of the step is within a range of 0.01 mm or more and 0.2 mm or less, no influence is exerted on the appearance, and when touched with a finger or the like, this portion is not tactually perceived. Accordingly, upon assembling the vehicle or upon washing the completed vehicle, the connecting end portion does not hit some objects, and the objects are not caught on the step, either. Note that a cross section viewed along line X-X of the connecting portion of the front terminal part 20d on the outside of the passenger compartment is in the same state as that shown in FIG. 5, and the description therefor is omitted.

Therefore, by setting the dimension H1 of the step A in the range of 0.01 mm or more and 0.2 mm or less, while the exterior portion is hindered from being damaged and the appearance is made favorable, the presence of the step A can be less likely to be tactually perceived. It is more preferable that an upper limit of the dimension H1 of the step A is 0.15 mm or less and it is further preferable that the upper limit is 0.1 mm or less.

Each of the upper plate part 23a, the lower plate part 23c, and the longitudinal plate part 23b is formed of a material whose principal component is resin. Specifically, the material to be used is composed principally of a thermoplastic resin generally used, such as polypropylene, polyethylene, polyamide, polyvinyl chloride, and polyester resin. Any one kind of these resin components may be used, or any two or more kinds of these resin components may be mixed to be used. In terms of molding processability, durability for outdoor use, reduction in weight in consideration of use as a product, co-workability with other material, and the like, polypropylene or polyethylene is preferably used and polypropylene is more preferably used among these thermoplastic resins. In addition, besides the resin component as the principal component, these materials may contain components such as a filler, an impact absorbing material, and a fluidity controlling material which are generally known.

As shown in FIG. 3, the glass run body 21 has an inside sealing plate part 24, an upper lip 25, an elongated protrusion 26, and an outside sealing lip 27a. An inner decoration lip 22, the inside sealing plate part 24, the upper lip 25, the elongated protrusion 26, and the outside sealing lip 27a correspond to a sealing portion. Although a material of which these sealing portions are formed is not limited to the materials below, cited as the materials include a soft rubbery elastic body whose hardness measured by the type A durometer specified in the standards of JIS K 6253 is between 40 and below 90 and preferably, between 50 and 80, and for example, a rubber material such as ethylene-propylene-diene rubber (EPDM) or a thermoplastic elastomer such as an ethylene-α-olefin copolymer, soft polyvinyl chloride, an olefinic thermoplastic elastomer, a styrenic thermoplastic elastomer, a polyester-based thermoplastic elastomer, and a polyurethane-based thermoplastic elastomer is used. Among these, the olefinic thermoplastic elastomer or the styrenic thermoplastic elastomer is favorably used. The material of these portions may be the same one, or the material of each of these portions may be optionally selected, respectively. The front terminal part 20d, the front connecting part 20e, the rear connecting part 20f, and the rear terminal part 20g are wholly formed of a material (material having a similar hardness) similar to the material of the upper lip 25 and the like.

A material of the inner decoration lip 22, the inside sealing plate part 24, the upper lip 25, the elongated protrusion 26, the outside sealing lip 27a, the front connecting part 20e, the rear connecting part 20f, the front terminal part 20d, and the rear terminal part 20g may be a foamed material or a solid material.

The inside sealing plate part 24 extends downward from an end portion on a lower surface of the lower plate part 23c on the inside of the passenger compartment. A lower end portion of the inside sealing plate part 24 is located below a lower end portion of the outside sealing lip 27a. The inside sealing plate part 24 is inclined to extend downward toward the inside of the passenger compartment. On an exterior surface of the inside sealing plate part 24, a first inside sealing lip 24a is formed in such a way as to extend outward on the outside of the passenger compartment. On the exterior surface of the inside sealing plate part 24 on a side lower than the first inside sealing lip 24a on the outside of the passenger compartment, a second sealing lip 24b is formed in such a way as to extend toward the outside of the passenger compartment, below the first inside sealing lip 24a on the exterior surface of the inside sealing plate part 24. The first inside sealing lip 24a and the second sealing lip 24b are inclined in such a way as to extend upward toward the outside of the passenger compartment, and makes contact with an inner surface of the window glass 4 on the inside of the passenger compartment. In addition, a surface of the inside sealing plate part 24 on the inside of the passenger compartment is located in such a way as to face an outside bulge 6a of the second panel member 6 of the window frame 3.

The upper lip 25 is formed in such a way as to protrude upward from a middle portion on an upper surface of the upper plate part 23a in the inward-outward direction and is inclined in such a way as to extend upward toward the outside of the passenger compartment. The upper lip 25 is to seal a gap between an automobile body panel (not shown) and the automotive door 1 by making contact with the automobile body panel in a state in which the automotive door 1 is closed. The elongated protrusion 26 is formed in such a way as to protrude downward from an end portion on a lower surface of the upper plate part 23a on the inside of the passenger compartment.

A protruding end portion of the elongated protrusion 26 abuts on an upper surface of the plate glass run mount 10 in a state in which the plate glass run mount 10 is inserted into the insertion port 21a and thus, a gap between the plate glass run mount 10 and the glass run body 21 is sealed.

The outside sealing lip 27a is integrated with a lower end portion of the exterior portion 29, is bent toward the inside of the passenger compartment, and protrudes upward. The outside sealing lip 27a is in contact with the exterior surface of the window glass 4.

An inner decoration lip 22 is formed in a bent manner to extend from the outside of the passenger compartment in relation to the inner peripheral flange 11 and to reach a protruding end of the inner peripheral flange 11 and the inside of the passenger compartment in relation to the inner peripheral flange 11. Specifically, the inner decoration lip 22 has an exterior part 22a extending downward from a lower end portion of the inside sealing plate part 24, a lower part 22b extending from a lower end portion of the exterior part 22a to the inside of the passenger compartment, and an interior part 22c extending upward from an end portion of the lower part 22b on the inside of the passenger compartment. The inner decoration lip 22 has a substantially U-shaped cross section, which is formed by the exterior part 22a, the lower part 22b, and the interior part 22c and opens upward. The exterior part 22a of the inner decoration lip 22 is a portion which is located to face a surface of the inner peripheral flange 11 on the inside of the passenger compartment and covers the surface thereof. The exterior part 22a may come into contact with the inner peripheral flange 11. The lower part 22b of the inner decoration lip 22 is a portion which is located to face a lower end portion of the inner peripheral flange 11 and covers the lower end portion thereof. As described above, by covering the inner peripheral flange 11 with the inner decoration lip 22, the inner peripheral flange 11 is not exposed, thereby making the appearance favorable, and a part of a body of a passenger or the like does not directly make contact with the inner peripheral flange 11, thereby allowing safety to be enhanced.

A shape of the extrusion-molded glass run 20 is shown in FIG. 4, and an inclination angle of the inside sealing plate part 24 is gentle, as compared with a shape of the glass run 20 which has been assembled to the window frame 3 (shown in FIG. 3). That is to say, the glass run 20 is extrusion-molded such that an angle formed between the inside sealing plate part 24 and the lower plate part 23c becomes larger than that formed therebetween upon completing the assembling of the glass run 20 to the window frame 3. The reasons for that are to facilitate manufacturing and to allow the inside sealing plate part 24 and the lower plate part 23c to firmly come into contact with the window frame 3 thanks to the elastic force of the inside sealing plate part 24 and to be assembled thereto. Here, although the glass run body 21 is described with reference to FIG. 3 and FIG. 4, in the present disclosure, the glass run 20 may be configured in various manners except that the glass run 20 is provided with the exterior portion 29 on the exterior surface of the upper glass run edge 20a in the longitudinal direction, and the configuration thereof is not limited to the above-described configuration.

Figure 9:
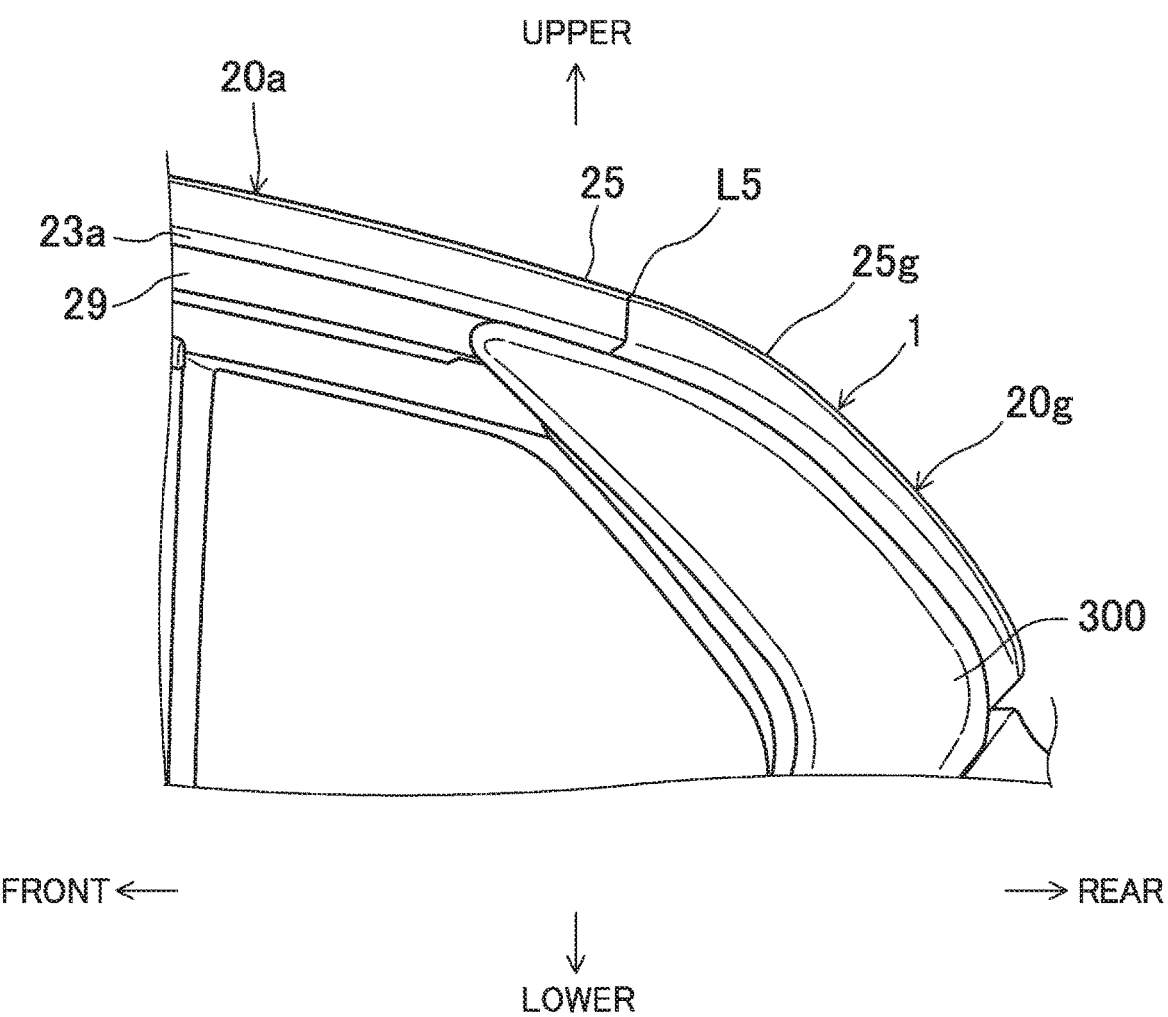
FIG. 9 is a perspective view of a rear portion of the rear door, viewed from an outside of a passenger compartment.
Figure 11:
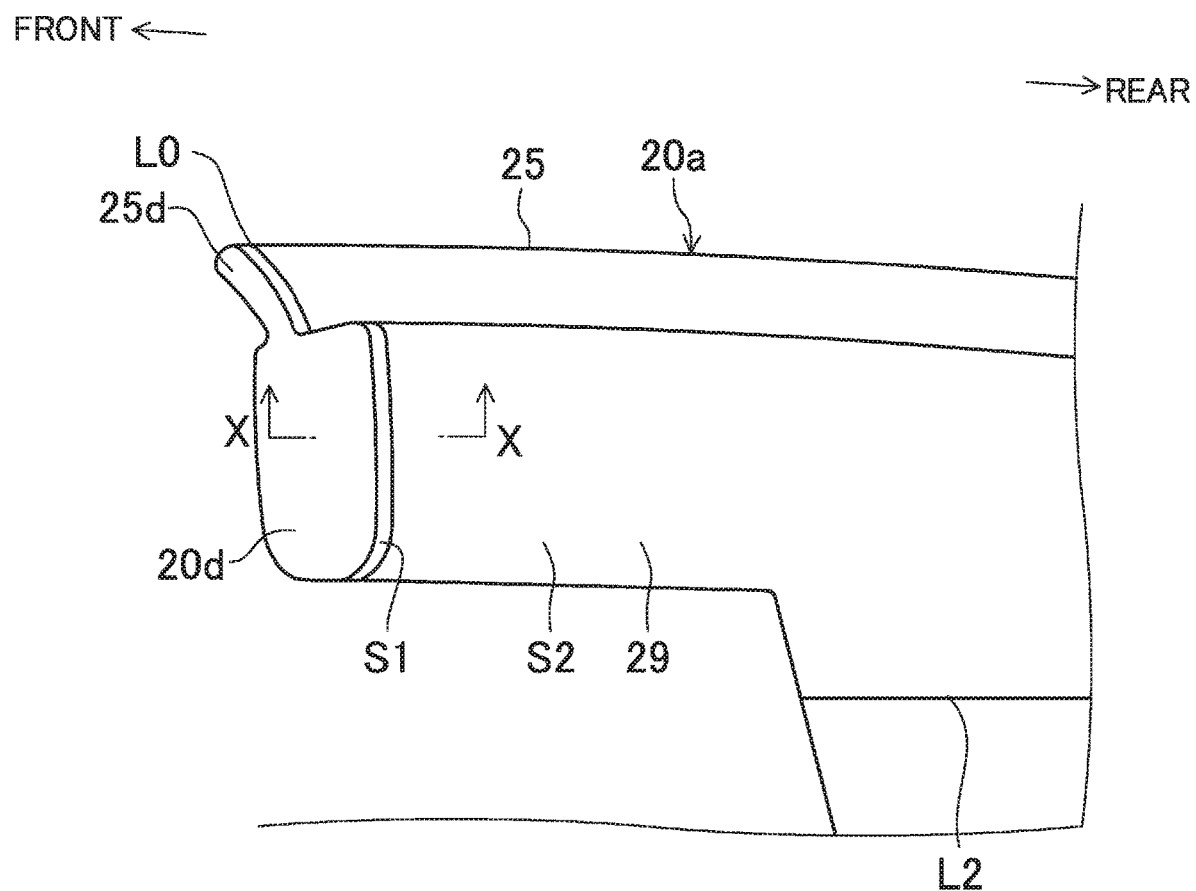
FIG. 11 is a perspective view of a vicinity of a connecting portion of a front end portion and a front terminal portion of an upper glass run edge, viewed from the outside of the passenger compartment.

Note that in FIG. 9 in which characteristic portions of the present disclosure are illustrated, the upper lip 25 which is provided for the extrusion-molded upper glass run edge 20a is molded integrally with a lip 25g of the rear terminal part 20g behind the upper glass run edge 20a in such a way as to be continuous with the lip 25g in the longitudinal direction. In FIG. 11, the upper lip 25 which is provided for the extrusion-molded upper glass run edge 20a is molded integrally with a lip 25d of the front terminal part 20d ahead of the upper glass run edge 20a in such a way as to be continuous with the lip 25d in the longitudinal direction.

As described above, the upper glass run edge 20a forms the upper lip 25 which is formed to be continuous in the front-rear direction. It is desirable that the front terminal part 20d and the rear terminal part 20g are formed of a soft rubbery elastic body whose hardness measured by the type A durometer is between 40 and below 90 and preferably, between 50 and 80, since the lip 25d and the lip 25g having sealing performance can be simultaneously integrally molded.

Note that a surface of the extrusion-molded upper lip 25 and surfaces of the mold-formed lip 25d and lip 25g are joined to be flush with each other.

(Manufacturing Method)

Next, a method for manufacturing the glass run 20 will be described with reference to FIGS. 6A to 6D. FIG. 6A to 6D illustrate the molding in FIG. 5 showing the cross section, viewed along line V-V shown in FIG. 10, of the connecting portion between the rear end portion of the upper glass run edge 20a and the rear terminal part 20g. The method for manufacturing the glass run 20 includes: an extrusion molding step in which a material is extrusion-molded and the exterior portion 29 and a peelable tape covering the exterior portion 29 are integrally extrusion-molded from a die of an extruder in a longitudinal direction on a surface coming to be an exterior surface of a passenger compartment, thereby obtaining the cross section of an upper glass run edge 20a; a forming step in which the long extrusion-molded portion is cut in a fixed length, thereby forming the upper glass run edge 20a; and a mold-forming step in which a surface TS of the tape T layered to cover the exterior portion 29 is made to contact a molding die 200, the surface TS of the tape T is disposed to be strongly pressed against the molding die 200 with the upper glass run edge 20*a* sandwiched between the molding die 200 and a mold piece (not shown) located in a position facing the molding die 200, the upper glass run edge 20*a* is set in the molding die 200, and thereafter, a material is supplied into the molding die 200, and a rear terminal part 20*g* is molded integrally with the upper glass run edge 20*a*, the rear terminal part 20*g* being continuous with a rear end portion of the upper glass run edge 20*a*. In the extrusion molding step, the material of the upper glass run edge 20*a* is extrusion-molded by using a well-known extrusion die or the like and the exterior portion 29 is obtained. On this extrusion die, the tape T is also attached to a surface S2 of the exterior portion 29 on the outside of the passenger compartment and is molded in an integrated state. Note that the tape T used in a tape attaching step is a protective tape for protecting the surface S2 of the exterior portion 29 and continuously cover the exterior portion 29, which is a long extrusion-molded portion, without any break. Note that at another timing after extrusion-molding the upper glass run edge 20*a*, the tape T may be continuously attached to the exterior portion 29 without any break or may be attached only to a portion for which the tape T is needed.

In the mold-forming step, as shown in FIG. 6(A), the upper glass run edge 20*a* is set in the molding die 200 for molding the rear terminal part 20*g*. At this time, the tape T is caused to be in close contact with an inner surface of the molding die 200. The molding die 200 is a molding die for injection molding, is divided into a plurality of pieces, though not shown, and opens and closes. By opening the molding die 200, the upper glass run edge 20*a* can be set in the molding die 200.

With the surface TS of the tape T strongly pressed against the molding die 200, as shown in FIG. 6(B), upon supplying the material of the rear terminal part 20*g* into an inside C of the molding die 200, this material flows toward a rear end portion 20*a*E of the upper glass run edge 20*a* and the rear terminal part 20*g* is integrally molded in such a way as to be continuous with the rear end portion 20*a*E of the upper glass run edge 20*a*.

Figure 6D:
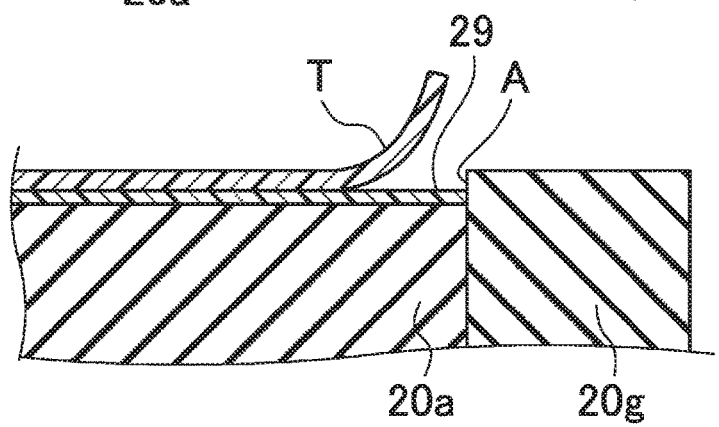
FIG. 6D illustrates a state of the manufacturing method in which a protective tape is going to be peeled.

Next, after the removal from the molding die as shown in FIG. 6(C), the tape T is peeled from the exterior portion 29 as shown in FIG. 6(D). Thus, between the surface S1 of the rear connecting part 20*f* on the outside of the passenger compartment and the rear end portion 20*a*E of the exterior portion 29, the above-described step A is formed. The timing at which the tape T is peeled from the exterior portion 29 may be timing immediately after molding or may be timing after the glass run 20 has been assembled to the door 1. The tape T is not limited to the protective tape and may be a tape, film, or a spacer which has a thickness with which the above-described step A can be formed.

In addition, other than the method of obtaining the step A by using the tape T, for example, a projection portion having a thickness corresponding to a thickness of the tape T may be provided on an inner surface of the molding die 200 and the step A may be obtained by this projection portion. Note that the front terminal part 20*d* is similarly manufactured.

Advantages of Embodiment

As described above, according to this embodiment, since the surface S1 of the rear terminal part 20*g* on the outside of the automotive passenger compartment is located further outside than the surface S2 of the rear end portion of the exterior portion 29 on the outside of the passenger compartment, which is provided on the upper glass run edge 20*a*, for example, upon handling the glass run 20 until the glass run 20 is attached to the door 1 and upon assembling the exterior member (the garnish 300 or the like) over both of a surface of the rear terminal part 20*g* and the exterior portion 29 which is the extrusion-molded portion, some objects are likely to hit the surface of the rear terminal part 20*g* on the outside of the passenger compartment, as compared with the rear end portion of the exterior portion 29, and as a result, the objects are less likely to hit the rear end portion of the exterior portion 29. Thus, the exterior portion 29 is inhibited from being damaged, and deterioration in the appearance of the exterior portion 29 is suppressed.

In addition, although the front terminal part 20*d* is an appearance surface which is exposed on the completed vehicle, a step thereof is small and not conspicuous.

In addition, some objects do not hit the front end portion of the exterior portion 29, and thus, the exterior portion 29 is inhibited from being damaged. Note that since the front end portion of the exterior portion 29 is shadowed by the end portion (step A) of the front terminal part 20*d*, the front end portion thereof is less likely to be conspicuous, thereby reducing the deterioration in the appearance.

Since the material of the exterior portion 29 is harder than the material of the mold-formed portion such as the rear terminal part 20*g* and the front terminal part 20*d*, that is, the material of the mold-formed portion is soft. Hence, even if some objects hit the mold-formed portions, the impact is absorbed, thereby inhibiting the exterior portion 29 from being damaged.

Note that a member referred to as the exterior member is not only the garnish 300. The exterior member includes a gusset which has a different name but is used in a manner similar as the garnish 300 is, and a term of the exterior member is a collective term.

Second Embodiment

Figure 7:
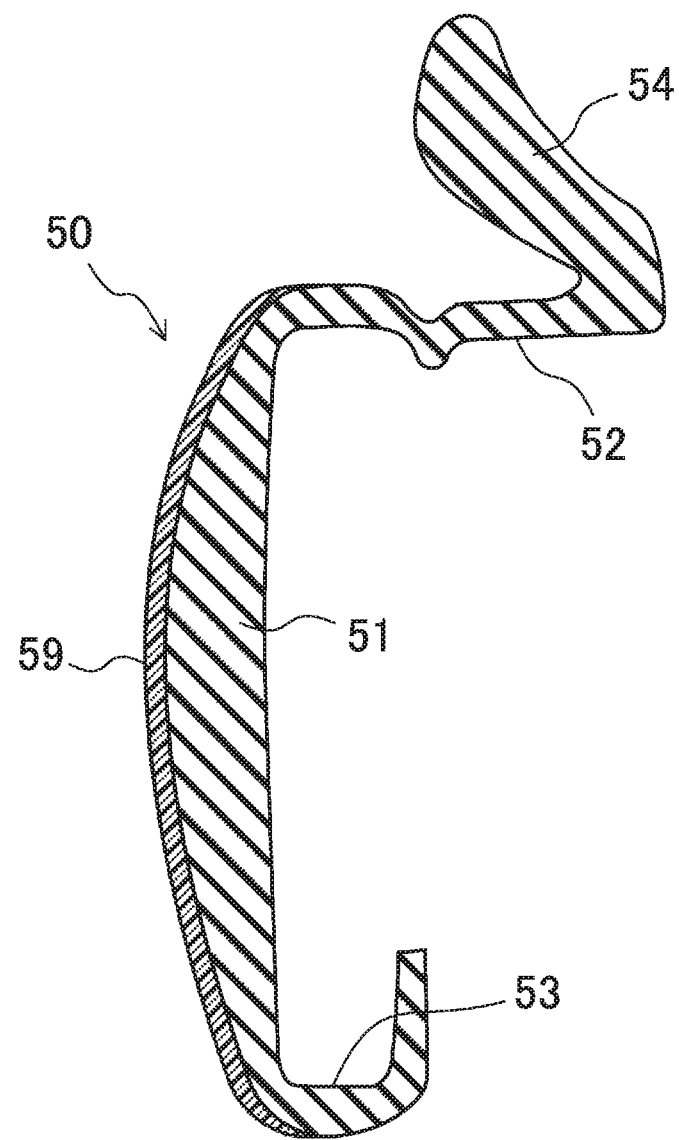
FIG. 7 is a cross-sectional view of an automotive door sealing member according to a second embodiment of the present disclosure.

FIG. 7 is a cross-sectional view of a sealing member 50 according to a second embodiment of the present disclosure. In the second embodiment, the present disclosure is applied to the sealing member 50 which is separately assembled to a glass run (not shown), and a structure of the sealing member to which the present disclosure is applied is different from that in the first embodiment.

Specifically, the sealing member 50 of the second embodiment has a basal plate part 51 formed to extend along an exterior surface of the glass run, an upper plate part 52 extending from an upper end portion of the basal plate part 51 along an upper surface of the glass run, and a lower fitting part 53 protruding from a lower end portion of the basal plate part 51 in such a way as to fit to a lower portion of the glass run. On an end portion of the upper plate part 52, a sealing member 54 is provided in such a way as to protrude upward. On an exterior surface of the basal plate part 51, an exterior portion 59 is provided.

The basal plate part 51 is an extrusion-molded portion, and in a front end portion and a rear end portion of the basal plate part 51, a mold-formed portion (not shown) is formed integrally with the basal plate part 51. A connecting structure of the extrusion-molded portion and the mold-formed portion is similar to that in the first embodiment, and the sealing member 54 is formed to be continuous from the extrusion-molded portion. As to the exterior portion 59, a step A is formed in a connecting position between the extrusion-molded portion and the mold-formed portions, whereby a surface of the mold-formed portion on the outside of the passenger compartment is located further outside than the exterior portion 59 on the outside of the passenger compartment.

Thus, as in the first embodiment, upon handling the sealing member 50 until the sealing member 50 is attached to the door 1 and upon washing a vehicle after the attachment, some objects are less likely to hit an end portion of the exterior portion 59. Thus, without providing a portion to cover the end portion of the exterior portion 59, the exterior portion 59 can be inhibited from being damaged. In addition, because a material having a hardness similar to that of the material of the sealing member 54 is used, the mold-formed portion can also have performance of sealing which is continuous from the extrusion-molded portion without any break.

Third Embodiment

Figure 8:
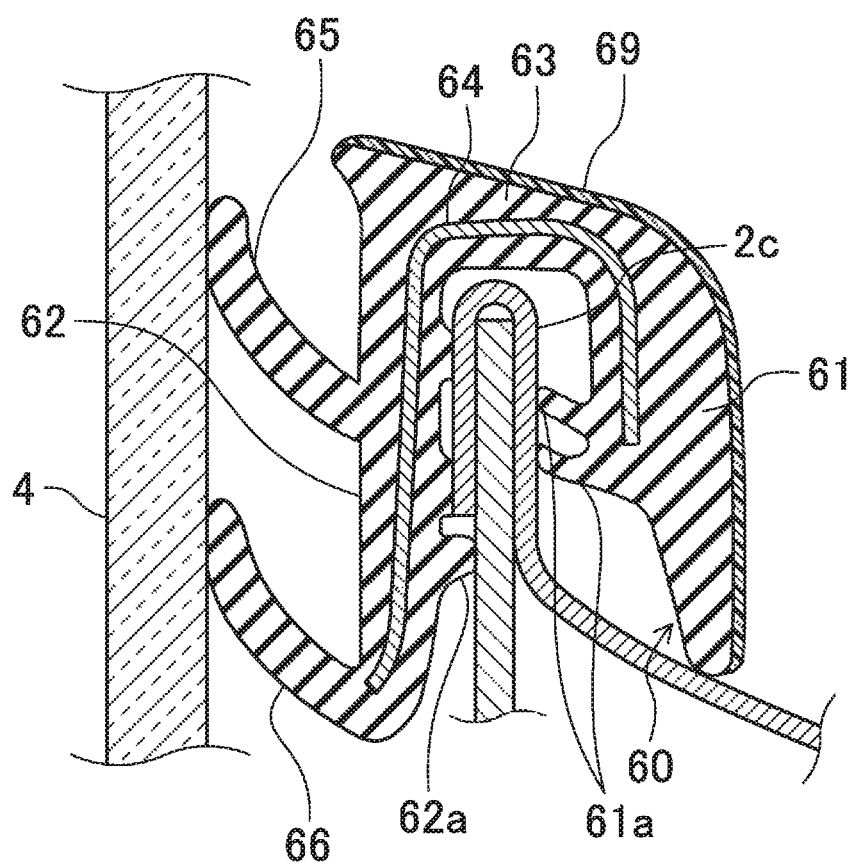
FIG. 8 is a cross-sectional view of a belt line sealing member as an automotive door sealing member according to a third embodiment of the present disclosure.

FIG. 8 is a cross-sectional view of a sealing member 60 according to a third embodiment of the present disclosure in an attached state. In the third embodiment, the present disclosure is applied to the belt line sealing member 60, and a structure of the sealing member to which the present disclosure is applied is different from that in the first embodiment.

A reference sign 2c in FIG. 8 indicates a belt line flange provided to an upper end portion of a door body 2 and extending in a front-rear direction. The belt line sealing member 60 has an exterior side wall part 61, an interior side wall part 62, and an upper wall part 63. The exterior side wall part 61 is provided with an outside protrusion 61a, and the interior side wall part 62 is provided with an inside protrusion 62a. The upper wall part 63 extends from an upper end portion of the exterior side wall part 61 to an upper end portion of the interior side wall part 62. Between the exterior side wall part 61 and the interior side wall part 62, the belt line flange 2c is inserted. Inside the exterior side wall part 61, the interior side wall part 62, and the upper wall part 63, a core member 64 formed of, for example, metal is embedded. On an upper side of the interior side wall part 62, an upper sealing lip 65 is formed, and on a lower side of the interior side wall part 62, a lower sealing lip 66 is formed. An exterior portion 69 is provided from the upper wall part 63 over an outer surface of the exterior side wall part 61.

A middle portion of the belt line sealing member 60 in a longitudinal direction is an extrusion-molded portion, and on both end portions of this extrusion-molded portion, mold-formed portion (not shown) is formed integrally with the extrusion-molded portion. The exterior portion 69 is provided over both end portions of the extrusion-molded portion of the belt line sealing member 60. A connecting structure between the extrusion-molded portion and the mold-formed portion is similar to that in the first embodiment, and the upper sealing lip 65 and the lower sealing lip 66 are formed to be continuous from the extrusion-molded portion. As to the exterior portion 69, a step A is formed in a connecting position between the extrusion-molded portion and the mold-formed portion, whereby a surface of the mold-formed portion on the outside of the passenger compartment is located further outside than a surface of the exterior portion 69 on the outside of the passenger compartment.

Thus, as in the first embodiment, upon handling the belt line sealing member 60 until the belt line sealing member 60 is attached to a door 1 and upon washing a vehicle after the attachment, some objects are less likely to hit an end portion of the exterior portion 69. Thus, without providing a portion to cover the end portion of the exterior portion 69, the exterior portion 69 can be inhibited from being damaged. In addition, because a material having a hardness similar to that of the material of the upper sealing lip 65 and the lower sealing lip 66 is used, the mold-formed portion can also have performance of sealing which is continuous from the extrusion-molded portion without any break.

The above-described embodiments are merely illustrative in every respect and shall not be construed in a limited manner. All modifications and variations coming within the equivalency range of the appended claims are embraced within the scope of the present disclosure.

As described above, an automotive door sealing member and a method for manufacturing the automotive door sealing member according to the present disclosure are applicable to, for example, a glass run, a belt line sealing member, and a weather strip of a door provided in a side portion of an automobile.

What is claimed is:

1. An automotive door sealing member being provided for an automotive door of an automobile having a passenger compartment, the automotive door sealing member comprising:
   an extrusion-molded portion formed by extrusion molding, the extrusion-molded portion extending in a longitudinal direction from one end portion to an opposite end portion of the extrusion-molded portion, the longitudinal direction corresponding with a forward-rearward direction of the automobile;
   a mold-formed portion formed integrally with an end surface of the one end portion of the extrusion-molded portion that faces in the longitudinal direction, such that the mold-formed portion is continuous with the extrusion-molded portion in the longitudinal direction; and
   an exterior portion provided on an exterior surface of the extrusion-molded portion toward an outside of the passenger compartment, the exterior portion extending in the longitudinal direction such that an end of the exterior portion reaches the one end portion of the extrusion-molded portion,
   wherein an outer surface of the mold-formed portion facing an outside of the passenger compartment is located further outside than an outer surface of the exterior portion at the end of the exterior portion, and
   wherein:
   the mold-formed portion is integrally formed with the end surface of the one end portion of the extrusion-molded portion at a connecting portion of the automotive door sealing member,
   the end of the exterior portion extends to the connecting portion of the door sealing member and terminates at the mold-formed portion, and
   a step is formed at the connecting portion between the outer surface of the mold-formed portion and the outer surface of the exterior portion at the end of the exterior portion, such that a surface of the step protrudes toward the outside of the passenger compartment and faces in the longitudinal direction.

2. The automotive door sealing member of claim 1, wherein
   a material of the exterior portion is harder than a material of the mold-formed portion.

3. The automotive door sealing member of claim 1, wherein
a thickness of the step is in a range from 0.01 mm, inclusive, to 0.2 mm, inclusive.

* * * * *